(12) United States Patent
Gurcan

(10) Patent No.: US 6,940,629 B2
(45) Date of Patent: Sep. 6, 2005

(54) MEMS DRIVER

(75) Inventor: Hakan Ates Gurcan, Los Gatos, CA (US)

(73) Assignee: Decicon, Inc., San Jose, CA (US)

( * ) Notice: Subject to any disclaimer, the term of this patent is extended or adjusted under 35 U.S.C. 154(b) by 0 days.

(21) Appl. No.: 10/795,202

(22) Filed: Mar. 4, 2004

(65) Prior Publication Data

US 2004/0179257 A1 Sep. 16, 2004

Related U.S. Application Data

(62) Division of application No. 10/082,822, filed on Oct. 24, 2001, now Pat. No. 6,809,851.

(51) Int. Cl.[7] .............................................. G02B 26/00
(52) U.S. Cl. ....................... 359/290; 359/291; 359/296; 359/298
(58) Field of Search ................................. 359/290, 291, 359/296, 214, 224, 298, 295

(56) References Cited

U.S. PATENT DOCUMENTS

| | | | |
|---|---|---|---|
| 4,194,214 A | | 3/1980 | Awane et al. |
| 4,271,488 A | | 6/1981 | Saxe |
| 4,317,611 A | | 3/1982 | Petersen |
| 4,441,791 A | | 4/1984 | Hornbeck |
| 4,885,628 A | | 12/1989 | Nagai et al. |
| 4,943,761 A | * | 7/1990 | Fox et al. .................... 323/283 |
| 5,212,582 A | | 5/1993 | Nelson |
| 5,479,170 A | | 12/1995 | Cauwenberghs et al. |
| 5,535,047 A | | 7/1996 | Hornbeck |
| 5,712,636 A | | 1/1998 | Buch |
| 6,028,689 A | | 2/2000 | Michalicek et al. |
| 6,441,449 B1 | * | 8/2002 | Xu et al. ..................... 257/414 |
| 6,490,385 B1 | * | 12/2002 | Rolt et al. .................... 385/18 |
| 6,504,641 B2 | * | 1/2003 | Chan et al. .................. 359/254 |
| 6,529,654 B1 | * | 3/2003 | Wong et al. .................. 385/16 |
| 2002/0101769 A1 | | 8/2002 | Garverick et al. |

OTHER PUBLICATIONS

Nagel, D. et al., "MEMS: Micro Technology, Mega Impact" *IEEE* (2001 pp 14–25.
Van De Plassche, R., "Integrated Analog–To–Digital and Digital–To–Analog Converters" *Kluwer Academic Publishers*.
Analog Devices, www.analog.com/bulletins/hssp.
Apex Micro Technology, 32 Channel High Voltage Amplifier MA32.
Wireless Design & Development Cahners (2001).

* cited by examiner

*Primary Examiner*—Ricky L. Mack
*Assistant Examiner*—Brandi Thomas
(74) *Attorney, Agent, or Firm*—Townsend and Townsend and Crew LLP

(57) ABSTRACT

A MEMS driver includes a digital control block receiving an external digital control word and generating digital control signals for use in controlling a reference current source. The reference current source generates a reference current to a high voltage output stage in response to the digital control signals. The high voltage output stage generates an output current to an integrator in response to the reference current. The integrator provides an output voltage to a drive electrode that electrostically controls the position of the MEMS structure.

50 Claims, 9 Drawing Sheets

MEMS DRIVER

FIELD OF THE INVENTION

This invention relates to circuits that electrostatically drive MicroElectroMechanical Systems (MEMS) structures, and more specifically to systems and methods that drive individual micromirrors in an array of micromirrors.

BACKGROUND OF THE INVENTION

MEMS micromirrors have long been used for steering light beams in a variety of applications such as bar code scanners, image projectors, and optical networking. In all such applications, the micromirror element is actuated in response to an external stimulus provided by a controlling mechanism. One of the well-established and most-widely used methods of actuating the micromirrors is by electrostatic means. See, e.g., U.S. Pat. Nos. 4,317,611, 5,212,582, and 6,028,689. In this method a drive electrode is electrically isolated from but placed in close proximity to a micromirror. The micromirror body is biased at a certain voltage potential and the drive electrode is biased at another potential level. The difference between the potential levels exerts an electrostatic force on the micromirror element and changes its position.

Micromirrors can be controlled in digital mode or in analog mode, depending on the requirements of the particular application. Digital control mode is shown, e.g., in U.S. Pat. No. 5,535,047, where the micromirror element is in one of the two stable positions in response to a digital control signal.

On the other hand, applications that need positioning of the mirror element at arbitrary intermediate points of its overall movement range require analog control mode of operation. See, e.g., U.S. Pat. Nos. 4,441,791 and 6,028,689. The analog control mode is typically complemented by a closed control loop that measures the position of the micromirror element and provides corrective feedback to the driving circuitry.

It is desirable to build large arrays of micromirrors in a variety of applications. One such application is a spatial light modulator where the mirror array is used to reproduce an image on a projection screen by selectively steering beams from a uniform light source that shines on the array. Another application of the micromirror arrays is in the area of optical networking where individual light beams carrying digital data are steered by the micromirrors of the array for traffic routing in an "all optical" network. In the latter application, the size of the array that can feasibly be attained is an important parameter since it defines the volume of network traffic that an optical router can handle.

One of the problems associated with providing electrostatic drive to a large array of micromirrors is the prohibitively large number of control lines that are required to access the drive electrodes. A solution to this problem is a matrix addressing scheme such as the one disclosed in U.S. Pat. No. 4,441,791, where analog voltage levels are written to capacitors that serve as storage elements in a time multiplexed arrangement. A similar addressing scheme is also described in U.S. Pat. No. 4,271,488. Provided that the leakage currents are low and the update rate of the system can accommodate the oversampling level required by the control loop, the voltages on these holding capacitors can bias the drive electrodes. This method works satisfactorily when the accuracy requirement of the system is low, and the excitement voltage levels that the micromirrors require are suitable for making relatively simple analog switches. These analog switches may be integrated along with the micromirrors or integrated separately and assembled at a later stage in close proximity with the micromirrors.

However, when high voltages (e.g., defined as voltage levels on the order of a few tens of Volts to hundreds of Volts) and high accuracy levels (~14 bits) are required to excite the micromirrors, this approach is no longer suitable since it is difficult to make analog switches that can switch large voltage levels while satisfying various accuracy parameters such as off-isolation, crosstalk, and charge injection. Even if an ideal switch could be built and integrated within the array, the resulting system would require considerable external resources in digital-to-analog converters (DACs) and high voltage high speed voltage buffers for setting up and delivering the precise analog voltage levels to the array. Moreover, these external resources would need to meet severe performance requirements. These constraints impose substantial limitations on the size of the micromirror arrays that can be built.

Therefore, there is a need for electrostatic drivers for micromirror arrays that do not require high voltage analog switches or closely packed analog transmission lines.

SUMMARY OF THE INVENTION

In accordance with the present invention, a high voltage driver for a micromirror array is presented. In some embodiments, a High Voltage MEMS Driver (HVMD or "MEMS driver") cell includes at least one High Voltage Digitally Controlled Integrator (HVDCI) cell which includes at least one programmable current source supplying an output current to an Integrate-And-Hold (IAH) capacitor for a controlled duration to develop a voltage across the IAH capacitor. The voltage is applied to a drive electrode that electrostatically drives a MEMS structure. The HVDCI cell includes a digital control block generating digital control signals, a reference current source receiving the digital control signals and in response generating a reference current, and a high voltage output stage receiving the reference current and generating the output current to the IAH capacitor.

In some embodiments, the digital control block includes a counter coupled to a digital bus to receive an integration duration, and a number of storage elements (e.g., latches or registers) coupled to the digital bus to receive an integration direction and an integration current level. The counter outputs an active count signal to the reference current source during the integration duration. The latches output the integration direction and the integration current level to the reference current source.

In some embodiments, the reference current source includes a first current mirror with a reference branch and a number of output branches, and a decoder selectively enabling the output branches in response to the active count signal and the integration current level. In some embodiments, the first current mirror includes four output branches having respective current mirror ratios of 1:1, 1:1, 2:1, and 4:1.

In some embodiments, the reference current source further includes a second current mirror with a reference branch, a first group of output branches having a first common output node, and a second group of output branches having a second common output node. The decoder selectively enables the first or the second group of output branches in response to the active count signal, the integration direction, and the integration current level. In some embodiments, the first and the second group of output branches each include two output branches having respective current mirror ratios of 1/4:1 and 15/4:1.

In some embodiments, the high voltage output stage includes a pull-down path having a first current mirror and a second current mirror. The first current mirror includes a reference branch having an end coupled to a low voltage supply and another end coupled to the first common output node of the reference current source. The first current mirror further includes an output branch having an end coupled to the low voltage supply. The second current mirror includes a reference branch having an end coupled to the output branch of the first current mirror and another end coupled to ground. The second current mirror further includes an output branch having an end coupled to the IAH capacitor, and another end coupled to ground. In some embodiments, the first and the second output branches have respective current mirror ratios of 1:4 and 1:1. In some embodiments, the output branch of the second current mirror includes a high voltage transistor.

In some embodiments, the high voltage output stage further includes a pull-up path having a third current mirror, a fourth current mirror, and a fifth current mirror. The third current mirror includes a reference branch having an end coupled to the low voltage supply and another end coupled to the second common output node of the reference current source. The third current mirror further includes an output branch having an end coupled to the low voltage supply. The fourth current mirror includes a reference branch having an end coupled to the output branch of the third current mirror, and another end coupled to ground. The fourth current mirror further includes an output branch having an end coupled to ground. The fifth current mirror includes a reference branch having an end coupled to the output branch of the fourth current mirror and another end coupled to a high voltage supply. The fifth current mirror further includes an output branch having an end coupled to the high voltage supply and another end coupled to the IAH capacitor. In some embodiments, each output branch of the fourth and fifth current mirrors includes a high voltage transistor coupled to the high voltage supply. In some embodiments, the third, the fourth, and the fifth mirror branches have respective current mirror ratios of 1:4, 1:1, and 1:1.

Embodiments of the MEMS driver described above may be manufactured in such a size that allows the HVMD cell to be integrated underneath a micromirror within an area of, e.g., 1.2 by 1.2 mm$^2$.

Embodiments of the MEMS driver described above are beneficial in applications where the position of the micromirror is controlled by a digital control feedback loop. The digital control block takes as input a digital control word once every update cycle. The update cycle rate is defined by the oversampling (i.e., sampling analog signals at a great number of times per second to create an accurate conversion to digital signals) requirements of a digital control feedback loop. When a digital code word is loaded into the digital control block, the counter counts during the integration duration at a rate determined by the system clock frequency. The reference current source and the high voltage output stage are enabled during the count at a magnitude defined by the integration current level and in the integration direction. The high voltage output stage changes the voltage on the IAH capacitor by the precise amount as dictated by the digital control word. The digital control feedback loop keeps track of the position of the micromirror, thus the actual voltage level on the IAH capacitor need not be known.

Embodiments of the MEMS driver described above render external high performance digital-to-analog converters and high voltage amplifiers unnecessary, and make possible low voltage digital interface with external controllers. Eliminating the high performance DACs and amplifiers reduces overall power consumption of the MEMS driver. Since only digital signals are used to distribute the micromirror control information across an array of MEMS drivers, the MEMS driver array is inherently scalable with its size only limited by the speed of the digital logic. As the process technologies improve, and the speed of the digital logic increases, larger MEMS driver arrays and micromirror arrays can be manufactured.

Embodiments of the MEMS driver described above are particularly beneficial for micromirrors that require high voltages (tens to hundreds of volts) for positioning. The MEMS driver may be formed on a substrate using widely available CMOS processes supporting high voltage MOS transistors. Such high voltage transistors typically use a drain construction with a high voltage drift region and are able to sustain high drain-to-source voltages.

In embodiments of the MEMS driver in an array, high voltage control line routing and high voltage analog multiplexing are not required. Multiplexing can be done in the digital domain and all the routing between an external control circuitry and the MEMS driver array and within the MEMS driver array is of low voltage digital type (with the exception of an optional common low voltage reference bias line described later). High voltages may be confined to global power routing regions, and to areas within each individual HVMD cell, which are relatively easy to accommodate by inserting shielding below such lines if and where necessitated by the underlying circuitry. Furthermore, high drive voltages for one micromirror are confined to the area immediately below that micromirror which helps to avoid crosstalk between unrelated micromirrors in the array. In addition, digital control data can be transferred to the MEMS driver array in a serial data stream and converted to parallel data by additional circuitry on the same substrate as the MEMS driver array, further reducing the number of interconnects between the MEMS driver array and the external control circuitry.

Embodiments of MEMS driver generate voltages with a dynamic range that extends to within hundreds of millivolts of the supply rails. By using variable integration durations and integration current levels, various drive voltages can be realized without excessive circuitry.

These and other embodiments are further discussed below with reference to the following figures.

In the figures, elements having the same designation have the same or similar function.

DETAILED DESCRIPTION OF THE INVENTION

Figure 1:
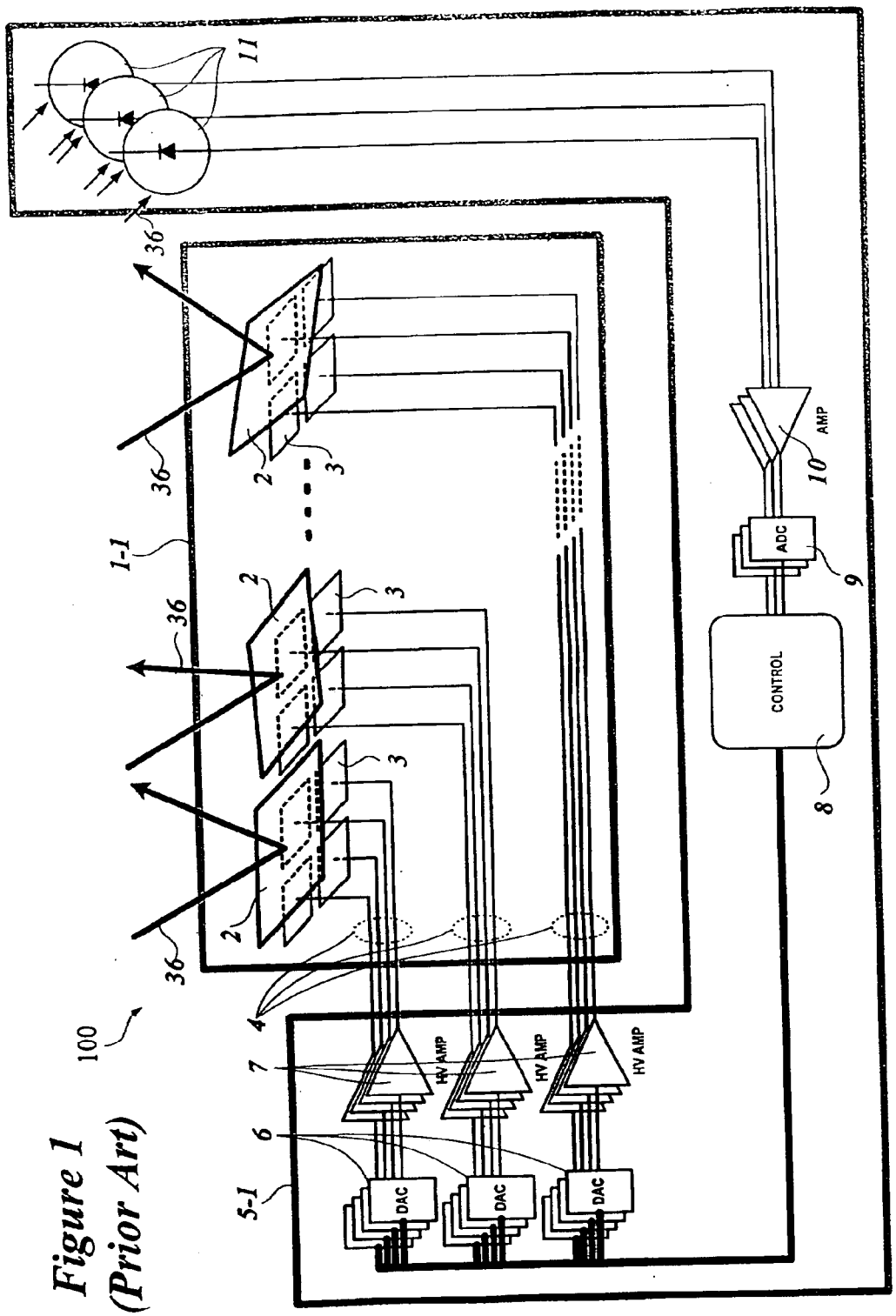
FIG. 1 is a block diagram illustrating a conventional micromirror system where a dedicated Digital-to-Analog Converter (DAC)—High Voltage (HV) amplifier pair drives each drive electrode of a micromirror.

FIG. 1 illustrates a conventional micromirror system 100 that includes a control circuitry 5-1 that provides high voltages to a driver array 1-1 that electrostatically drives a separately built array of micromirrors 2.

Control circuitry 5-1 includes a controller 8 that sends digital control signals to groups of DAC 6-HV amplifier 7 pairs. In each DAC 6-HV amplifier 7 pair, a DAC 6 supplies an analog control signal to a HV amplifier 7. Each HV amplifier 7 supplies a voltage to a corresponding drive electrode 3 on driver array 1-1. Driver array 1-1 includes corresponding groups of HV analog lines 4 and drive electrodes 3. Lines 4 carry the voltages from DAC 6-HV amplifier 7 pairs to drive electrodes 3. Each group of drive electrodes 3 electrostatically drives a corresponding micromirror 2. Each micromirror 2 reflects a light beam 36. Light beam 36 may be a carrier of data or an indicator of the position of a micromirror 2 in a feedback loop. Control circuitry 5-1 further includes photodiodes 11 that measure a light beam 36 reflected by a micromirror 2. Each photodiode 11 provides an analog feedback signal to a corresponding amplifier 10. Each amplifier 10 provides an amplified analog feedback signal to a corresponding Analog-to-Digital Converter (ADC) 9. Each ADC 9 supplies a digital feedback signal to controller 8. Controller 8 adjusts the digital control signals according to the digital feedback signals and to a control algorithm.

A variation of system 100 may include low voltage SAH stages before HV amplifiers 7 to reduce the number of DACs 6. In other words, one group of DACs 6 is multiplexed to multiple groups of HV amplifiers 7. The conventional driver array 1-1 is not easily scalable because as the array of micromirrors 2 increases in size, the amount wiring between control circuitry 5-1 and driver array 1-1 and the wiring (i.e., high voltage analog signal lines 4) within driver array 1-1 becomes undesirably large.

Figure 2:
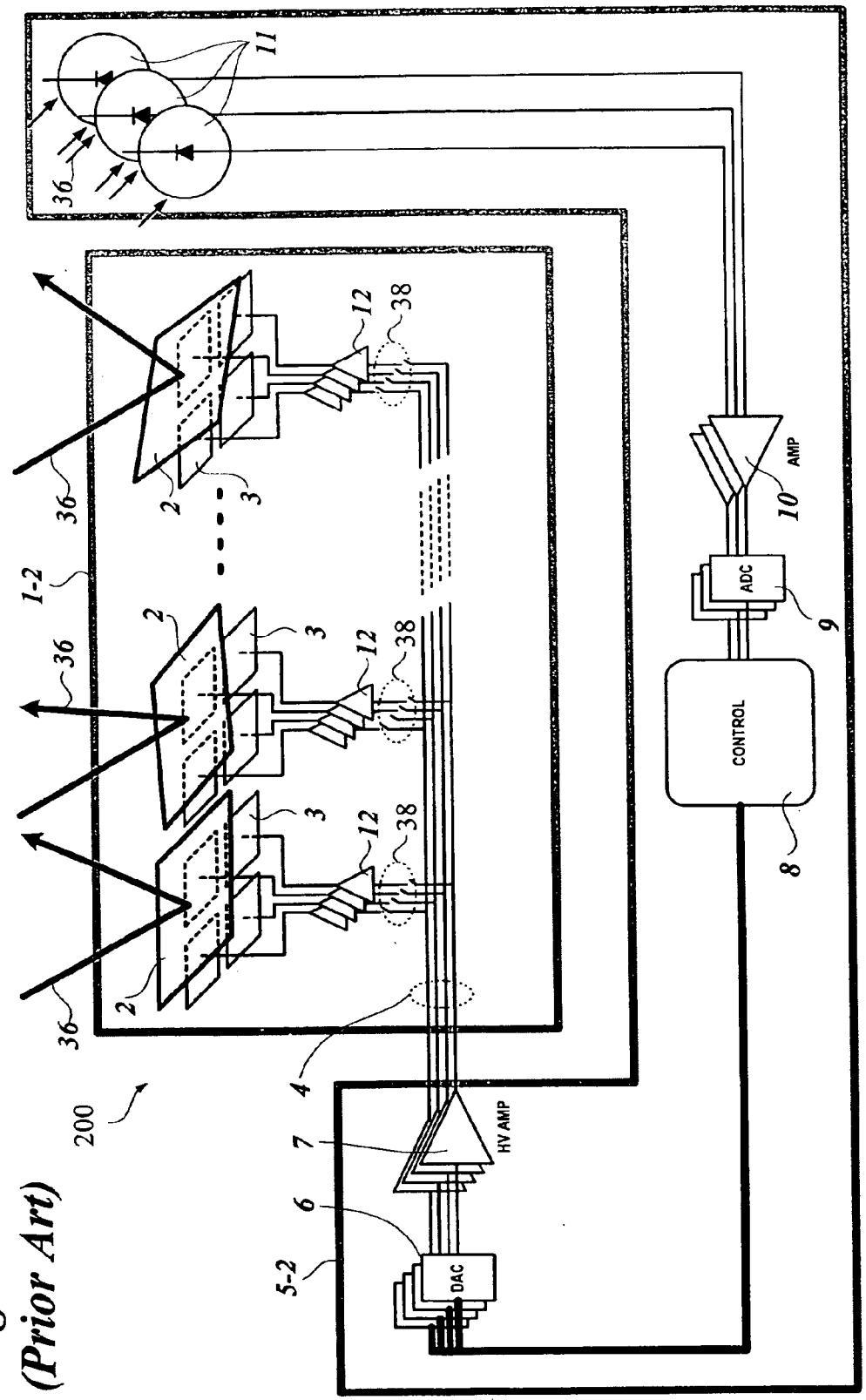
FIG. 2 is a block diagram illustrating a conventional micromirror system where a DAC-HV amplifier pair is shared between the drive electrodes of micromirrors in a row in a multiplexing arrangement.

FIG. 2 illustrates a conventional micromirror system 200 that may improve over system 100. Analog switches 38 multiplex one group of DAC 6-HV amplifier 7 pairs to multiple groups of SAH stages 12. Each group of SAH stages samples and holds the appropriate voltages, which are applied to the corresponding group of drive electrodes 3 for the duration of the update cycle as the DAC 6-HV amplifier 7 pairs cycle through the groups of drive electrodes 3.

System 200 still requires an HV analog interface between control circuitry 5-2 and driver array 1-2. However, the number of HV analog lines 4 decreases because of the multiplexing scheme used in system 200. Multiplexing the DAC 6-HV amplifier 7 pairs presents new challenges. DACs 6 and HV amplifiers 7 have to be faster so that they can settle within the time allocated for updating a given electrode voltage defined by the oversampling rate of the digital control loop. Additional challenges include charge injection (though mostly corrected by the control loop), coupling from control voltages for other electrodes on the same control line for the same row due to poor off-isolation of the analog switches, and especially the difficulty of building high-voltage (and reasonably fast) analog switches. Building high-voltage analog switches requires sophisticated process technologies that are not widely available today. The ones that are available have large feature sizes which limit their usefulness in area-critical applications.

Figure 3:
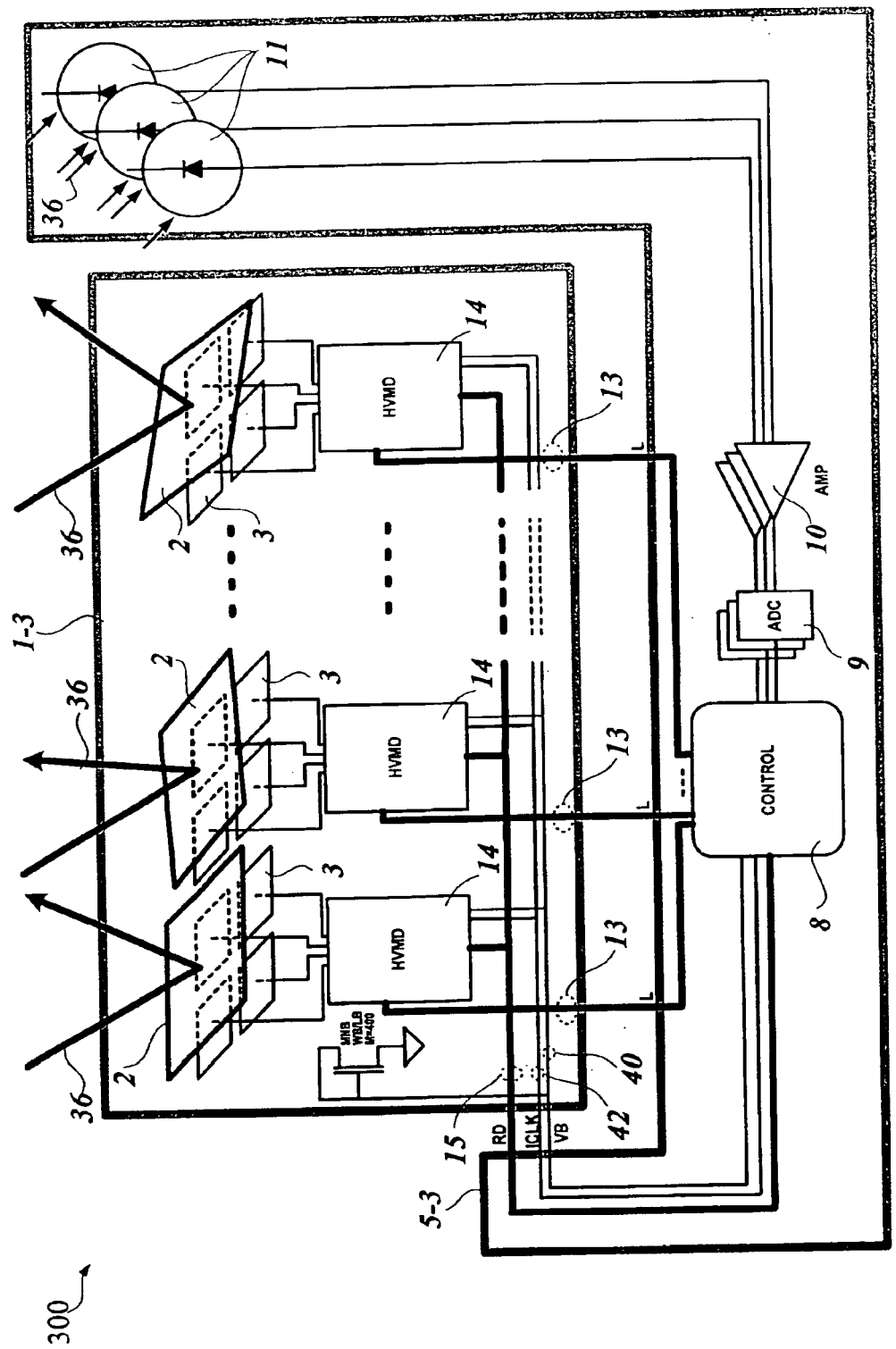
FIG. 3 is a block diagram illustrating a micromirror system in some embodiments of the invention where the functions of the DACs, HV amplifiers, analog switches, and Sample-And-Hold (SAH) circuits of FIG. 2 are performed by an HVMD cell located beneath each individual micromirror.

FIG. 3 illustrates a block diagram of a micromirror system 300 in embodiments of the invention. System 300 includes a driver array 1-3 that may be combined with a separately built micromirror array. For example, an array of micromirrors 2 may be bonded atop a driver array 1-3 as individual chips or as whole wafers. Alternatively, micromirror array and driver array 1-3 may be made as a single integrated circuit. The details of how driver array 1-3 and the micromirror array may be combined are known to one skilled in the art and therefore are not further disclosed here.

In some embodiments, the micromirror array includes micromirrors 2 arranged in rows and columns. The micromirror array is useful in a variety of applications that require the steering of light beams. Such applications include optical signal routing and projection display technologies. Although embodiments of the invention show driver array 1-3 applied to a micromirror array, the use of driver array 1-3 is not so limited and array 1-3 can be used in any application where a digital control loop electrostatically controls the position of a MEMS device.

FIG. 3 shows that driver array 1-3 controls the positions of multiple micromirrors 2 within a digital control loop for optical signal routing. In FIG. 3, only one row of micromirrors 2 is shown for clarity. Light beams 36 are reflected from micromirrors 2 and are sensed by photodiodes 11. Photodiodes 11 generate weak electrical currents that indicate the positions of the individual micromirrors 2. Amplifier 10 amplifies these electrical currents and ADCs 9 convert the amplified currents to digital code words. Controller 8 processes the digital code words according to a control algorithm and generates a different set of digital code words reflective of the electrostatic stimulus to be applied to the individual micromirrors 2 to bring micromirrors 2 to the desired position. Controller 8 supplies these digital code words to HVMD cells 14 (e.g., MEMS drivers) via row data buses 15 and column selection buses 13 (described in detail later). HVDCI cells 16 within each HVMD cell 14 (shown in FIGS. 4 and 5) then convert these digital code words to analog voltage levels on the individual drive electrodes 3. Each HVMD cell 14 drives a group of drive electrodes 3 that controls the position of an individual micromirror 2. In some embodiments, photodiodes 11, amplifiers 10, ADCs 9, controller 8 are external to driver array 1-3 and are collectively called control circuitry 5-3. A reference bias line 40 carries a reference bias voltage VB to HVMD cells 14. A clock line 42 carries a global clock ICLK to HVMD cells 14.

Figure 4:
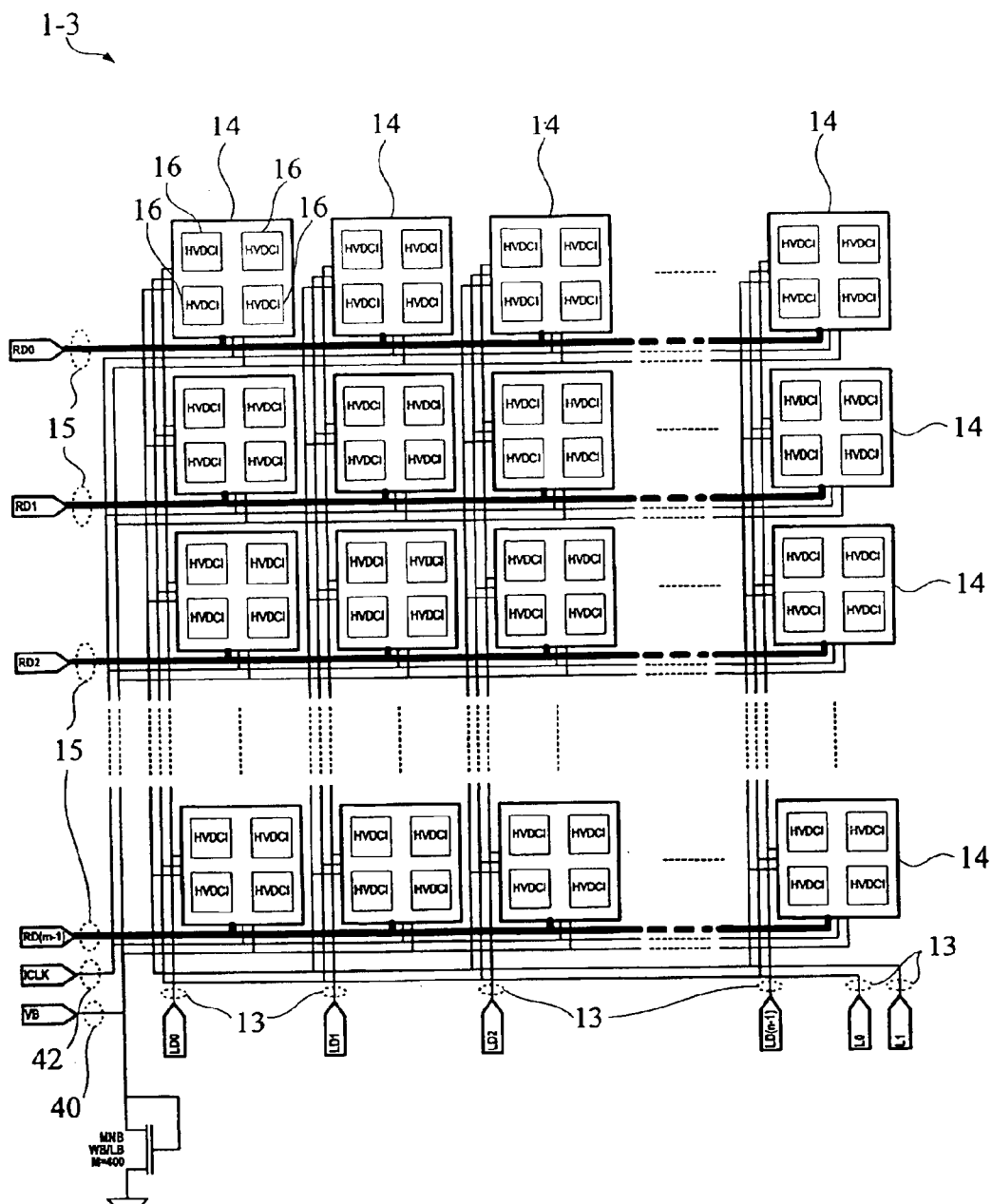
FIG. 4 is a block diagram illustrating an embodiment of a micromirror array of FIG. 3 arranged in n columns and m rows.
Figure 7:
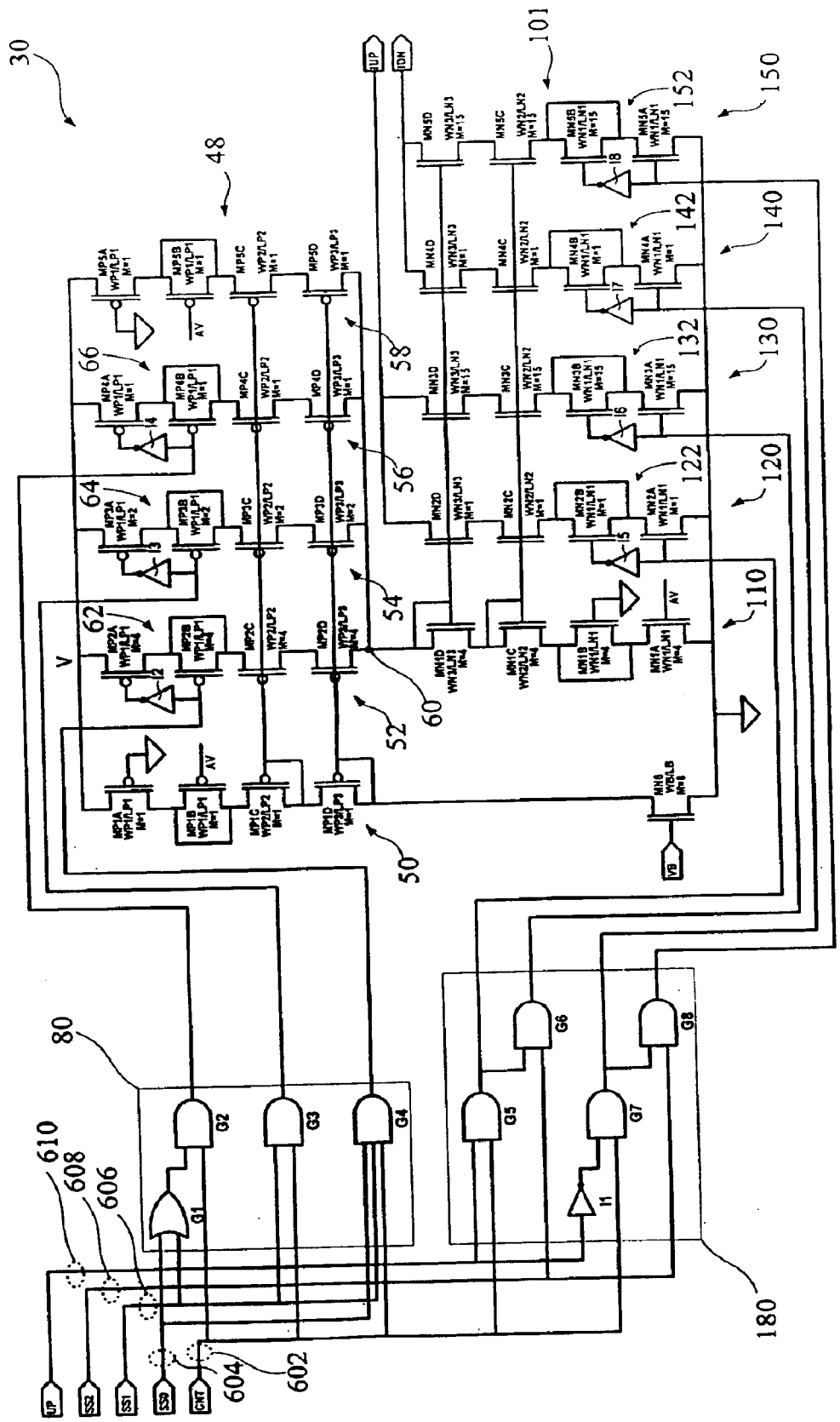
FIG. 7 is a CMOS transistor level circuit diagram illustrating an embodiment of a Reference Current Source (RCS) cell of the HVDCI cell of FIG. 5.
Figure 8:
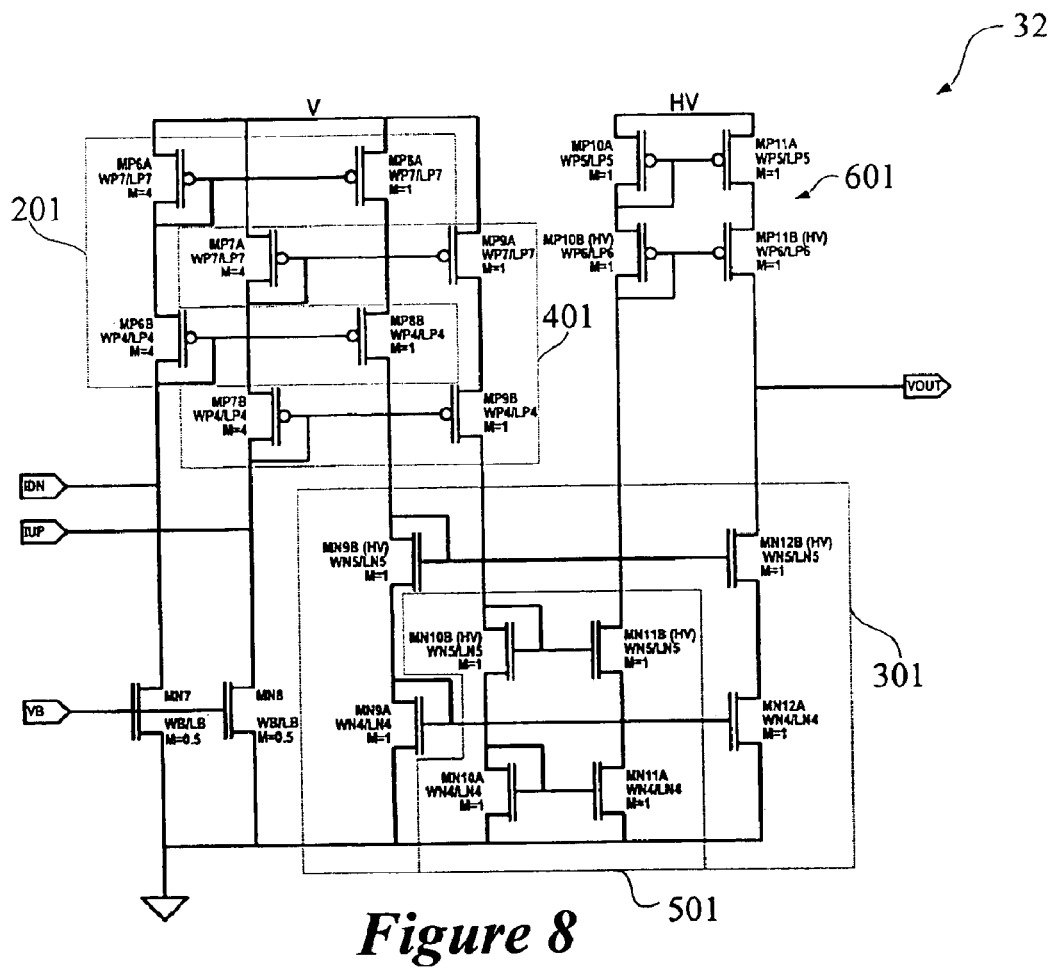
FIG. 8 is a CMOS transistor level circuit diagram illustrating an embodiment of a High Voltage Output Stage (HVOS) cell of the HVDCI cell of FIG. 5.

FIG. 4 shows an embodiment of driver array 1-3 that includes m rows and n columns of HVMD cells 14. Row data buses 15 (shown individually as buses RD(0) to RD(m-1)) carry into the array of HVMD cells 14 the digital code words that control changes to the voltages on individual drive electrodes 3. Each row has a dedicated bus RD(y) (where $0 \leq y \leq m-1$) carrying the digital code word to HVMD cells 14 on that particular row. Buses 13 include lines LD(0) to LD(n-1) that carry a signal selecting one column of HVMD cells 14 to receive the digital code word from buses RD(0) to RD(m-1). Buses 13 also include two lines L0 and L1 that select one HVDCI cell 16 within each HVMD cell 14. In some embodiments, HVMD 14 includes four HVDCI cells 16 to drive four drive electrodes 3 (FIG. 3). Reference bias line 40 carries a reference bias voltage VB and line 42 carries a clock signal ICLK for driver array 1-3. All internal signals of driver array 1-3 are of low voltage (e.g., defined as voltage levels on the order of Volts to a few tens of Volts) but for power distribution lines of power supplies V and HV (FIGS. 7 and 8). For clarity, FIG. 4 does not show the power distribution lines.

Figure 5:
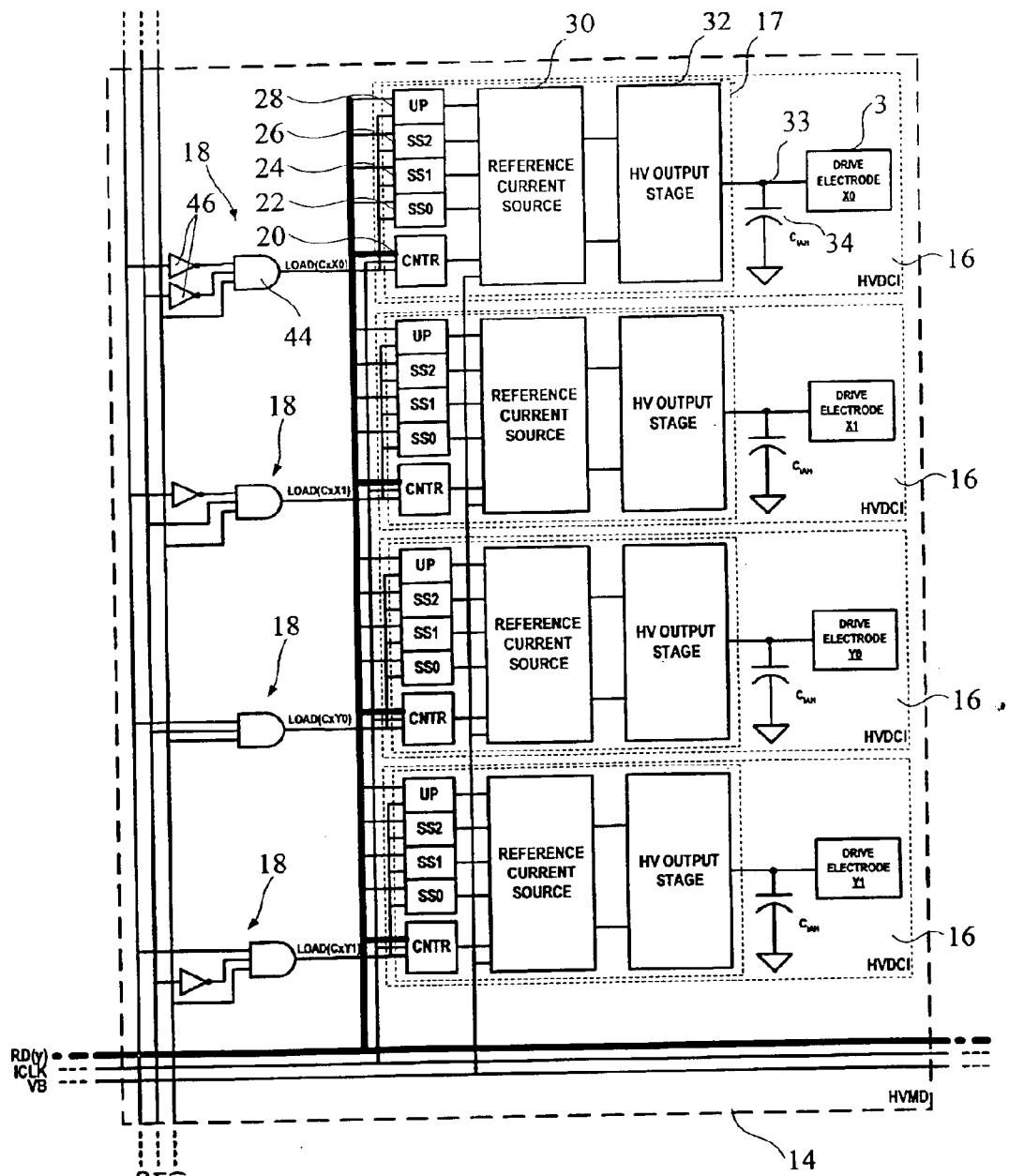
FIG. 5 is a block diagram illustrating an embodiment of a HVMD cell of FIG. 3, which includes decoding logic and four identical High Voltage Digitally Controlled Integrator (HVDCI) cells for four drive electrodes.

FIG. 5 shows some embodiments of HVMD cell 14. HVMD cell 14 includes four corresponding addressing circuits 18 and HVDCI cells 16. Addressing circuits 18 enables writing of digital control words from bus RD(y) into one of four HVDCI cells 16 selected by the signals on lines L0 and L1, in a column selected by the signal on line LD(x) (where $0<x<n-1$). Each addressing circuit 18 includes an AND gate 44 having one input terminal coupled to line LD(x) and two input terminals coupled to lines L0 and L1. Inverters 46 may be coupled between lines L0 and L1 and the two input terminals of AND gate 44 to set the desired combination of signals on buses L0 and L1 that selects one of the four HVDCI cells 16. Each addressing circuit 18 has an output terminal carrying a signal LOAD to the corresponding HVDCI cell 16. As can be seen from FIGS. 4 and 5, all HVMD cells 14 in the same column are written in parallel. Controller 8 provides the digital control words to all the rows in the selected column simultaneously.

Each HVDCI cell 16 provides electrostatic drive voltage to one of drive electrodes 3 (shown individually as X0, X1, Y0, and Y1). Voltage applied to drive electrodes X0 and X1 cause a micromirror 2 to pivot and traverse along its X-axis and voltage applied to drive electrodes Y0 and Y1 cause the micromirror 2 to pivot and traverse along its Y-axis. A micromirror can thus be positioned virtually anywhere within its allowed range of movement, by combining the voltage levels applied to individual drive electrodes.

In some embodiments, each HVDCI cell 16 includes a programmable current source 17 providing an output current to an integrator 34. Integrator 34 is, e.g., an IAH capacitor ($C_{IAH}$).

In some embodiments, the programmable current source 17 includes a counter 20 (e.g., 7 bits), four storage elements 22, 24, 26, and 28, a reference current source (RCS) 30, and a high voltage output stage (HVOS) 32. Storage elements 22, 24, 26, and 28 are, e.g., latches or registers. HVOS 32 provides the output current to a node 33. IAH capacitor 34 is coupled between node 33 and ground. Drive electrode 3 is also coupled to node 33. The output current from HVOS 32 develops a voltage across IAH capacitor 34 and that voltage is applied to drive electrode 3 connected to the same node 33.

In some embodiments, the capacitance of IAH capacitor 34 is selected to be significantly larger than the stray capacitance formed in the air gap between drive electrodes 3 and micromirror 2. When micromirror 2 moves, the distance between drive electrodes 3 and micromirror 2 changes and thereby alters the value of the stray capacitance. The large capacitance of IAH capacitor 34 allows it to hold its voltage virtually constant as the position of micromirror 2 changes. In one implementation, the value of IAH capacitor 34 is 10 pF. Embodiments of the sub-blocks of HVDCI cell 16 are further described in reference to FIGS. 6 through 8.

Figure 6A:
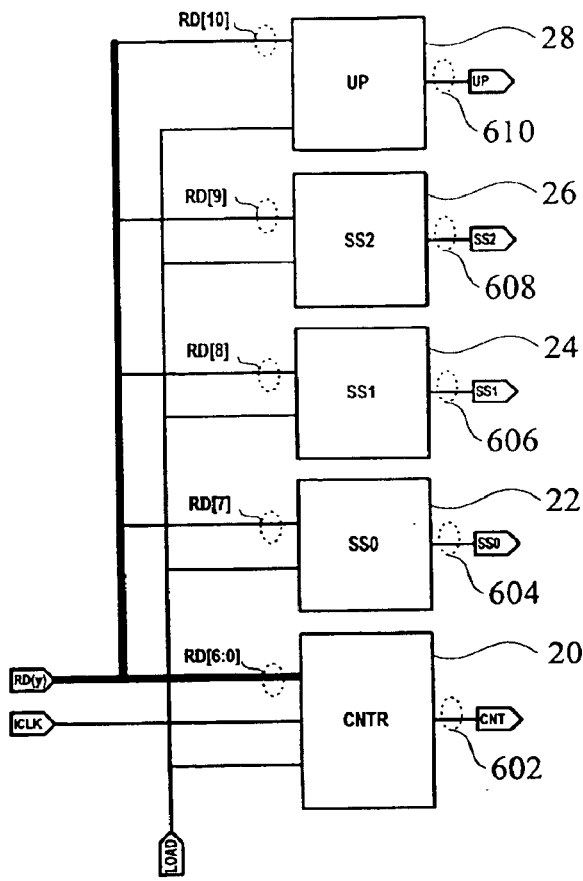
FIG. 6A is a block diagram illustrating an embodiment of storage elements and an integration counter that form a digital control block of the HVDCI cell of FIG. 5.

FIG. 6A shows an embodiment of counter 20 and latches 22, 24, 26, and 28 in HVCDI cell 16. Each of counter 20 and latches 22, 24, 26, and 28 has a control terminal coupled to terminal labeled LOAD from corresponding addressing circuit 18. Counter 20 has data terminals coupled to lines of bus RD(y) to receive bits representing an integration duration. Each of latches 22, 24, and 26 has a data terminal coupled to a line of bus RD(y) to receive a bit representing an integration current level. Latch 28 has a data terminal coupled to a line of bus RD(y) to receive a bit representing an integration direction.

Figure 6B:
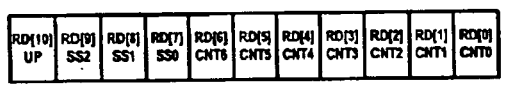
FIG. 6B is a block diagram illustrating an organization of the digital control code received by the storage elements and by the programmable counter of FIG. 6A.

FIG. 6B shows the organization of some embodiments of the digital code word. In some embodiments, the digital code word is 11-bit wide. In the 11-bit digital control word, the lower 7 bits on lines RD[6:0] are the count duration (representing integration duration) of counter 20, the next 3 bits on lines RD[7:9] are integration current level selection bits for latches 22, 24, and 26, and the most significant bit on line RD[10] is the integration direction bit for latch 28. Counter 20 is programmable (e.g., presetable). Counter 20 can generate an active count signal whose duration can be programmed by RD[6:0] lines from 0 to ($2^7-1$) periods of integration clock signal ICLK.

Figure 6C:
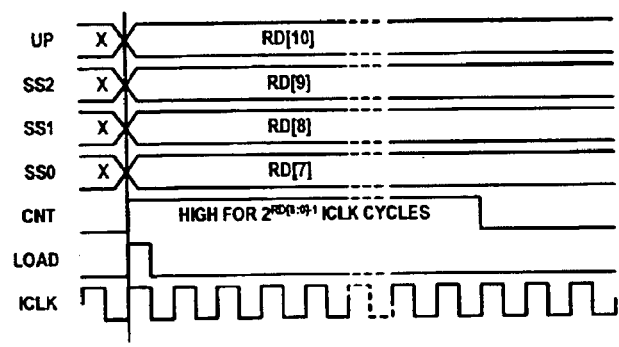
FIG. 6C is a timing diagram illustrating a sample load and integrate sequence.

FIG. 6C shows the output signals of counter 20 and latches 22, 24, 26, and 28 in response to a digital code word. When signal LOAD is active, counter 20, latches 22, 24, 26, and 28 read the data on their input lines from bus RD(y). When signal LOAD is inactive, counter 20 supplies an active bit (i.e., an active signal CNT, provided that it was programmed with a non-zero value) on an output terminal 602 until it finishes counting. When signal LOAD is inactive, latches 22, 24, 26, and 28 latch and output respective bits SS0, SS1, SS2, and UP on respective output terminals 604, 606, 608 and 610.

In some embodiments, integration clock signal ICLK is 5 MHz and thus the highest counter setting of 1111111 results in an integration time of 25.4 μs. Counter 20 can achieve time intervals down to 0 with 200 ns resolution. The digital code word controls the voltage level change on IAH capacitor 34 in one update cycle, according to the following formula.

$$\Delta V(C_{IAH}) = I_{LSB} * 2^{(4*SS2+2*SS1+SS0)} * T_{COUNTER}/C_{IAH} \quad (1.1)$$

In Equation 1.1, bits CNT, SS0, and SS1 are binary signals which can assume the values of 0 or 1.

Depending on the value of the UP bit, the delta voltage value ($\Delta V$) is either added to (UP=1) or subtracted from (UP=0) the voltage level existing on IAH capacitor 34 prior to the current update cycle. Provided that the leakages are negligible, $C_{IAH}$ holds the resulting voltage level until the next update cycle. Current $I_{LSB}$ is generated using the reference bias voltage VB which is distributed globally throughout the array.

In some embodiments, reference bias voltage VB is generated as the gate to source voltage of a diode connected (i.e., drain and gate terminals shorted together) MOS transistor (MNB in FIGS. 3 and 4) through which controller 8 forces an external current $I_{REF}$. In one implementation, the diode connected transistor is made of 400 identical NMOS devices (transistors) of channel width WB/channel length LB (e.g., 11.5 μm/25 μm) connected in parallel and the value of the external reference current is $I_{REF}$=160 μA.

FIG. 7 shows a circuit diagram of an embodiment of a reference current source (RCS) 30. RCS 30 includes current mirrors 48 and 101. In some embodiments, PMOS transistors MP1C, MP1D, MP2C, MP2D, MP3C, MP3D, MP4C, MP4D, MP5C, MP5D form a cascode current mirror 48. Current mirror 48 includes a reference branch 50 and four output branches 52, 54, 56, and 58. Reference branch 50 includes transistors MP1C and MP1D. Transistor MP1C has a drain terminal coupled to a source terminal of transistor MP1D and a gate terminal coupled to the gate terminals of transistors MP2C to MP5C. Transistor MP1D has a drain terminal coupled to a drain terminal of a transistor MN6 and a gate terminal coupled to the gate terminals of transistors MP2D to MP5D. Transistors MP1C and MP1D are diode connected transistors.

Transistor MN6 has a source terminal coupled to ground and a gate terminal coupled to reference bias voltage VB. Transistor MN6 provides the reference current to current mirror 48. In some embodiments, transistor MN6 comprises 8 NMOS devices with channel width equal to 11.5 μm and channel length equal to 25 μm connected in parallel. Consequently, the current through transistor MN6 is ID(MN6)=160 μA*8/400=3.2 μA. Current ID(MN6) flows through the diode connected transistors MP1C and MP1D.

In some embodiments, transistor MN6 is replaced by a resistor or a diode connected transistor to generate the reference current. In these embodiments, line 40 (FIG. 4) carrying reference bias voltage VB is eliminated from driver array 1-3 to further reduce analog interface with control circuitry 5-3.

Output branch 52 includes transistor MP2C coupled in series with transistor MP2D. Output branches 54, 56, and 58 include transistors MP3C, MP3D, MP4C, MP4D, MP5C, and MP5D coupled in the same manner as output branch 52. Transistors MP2D to MP5D have their drain terminals coupled to a common drain node 60.

Transistors MP5C and MP5D have the same channel width and the same channel length as transistors MP1C and MP1D. Thus, the drain terminal of transistor MP5D carries a current that is substantially equal to the input current through transistor MP1D. In other words, output branch 58 has a current mirror ratio of 1:1 to reference branch 50. Similarly, transistors MP4C and MP4D have the same channel width and the same channel length as transistors MP1C and MP1D and thus output branch 56 outputs the substantially same current as transistor MP1D. Transistors MP3C and MP3D have twice the channel width and the same channel length of transistors MP1C and MP1D and thus output branch 54 sources out twice the current as transistor MP1D. Transistors MP2C and MP2D have four times the channel width and the same channel length of transistors MP1C and MP1D and thus output branch 52 outputs four times the current through transistor MP1D. Thus, output branches 52, 54, 56, and 58 have respective current mirror ratios of 4:1, 2:1, 1:1, and 1:1 to reference branch 50.

In some embodiments, mirror branches 52, 54, and 56 are respectively coupled to a voltage supply V via switches 62, 64, and 66. Switch 62 includes PMOS transistors MP2A and MP2B. Transistor MP2A has a source terminal coupled to voltage supply V, a drain terminal coupled to the source and drain terminals of transistor MP2B (transistor MP2B having source and drain shorted together), and a gate terminal coupled to an output terminal of an inverter I2. Inverter I2 has an input terminal coupled to an output terminal of a logic gate G4. Transistor MP2B has a drain terminal coupled to the source terminal of transistor MP2C and to the drain terminal of transistor MP2A, and a gate terminal coupled to the output terminal of logic gate G4.

Switches 64 and 66 are similarly constructed as switch 62 respectively from (1) transistor MP3A, transistor MP3B, and inverter I3, and (2) transistor MP4A, transistor MP4B, and inverter I4, respectively. In switch 64, transistor MP3A has a gate terminal coupled to an output terminal of an inverter I3 and transistor MP3B has a gate terminal coupled to an output terminal of logic gate G3. Inverter I3 has an input terminal coupled to the output terminal of logic gate G3. In switch 66, transistor MP4A has a gate terminal coupled to an output terminal of an inverter I4 and transistor MP4B has a gate terminal coupled to an output terminal of logic gate G2. Inverter I4 has an input terminal coupled to the output terminal of logic gate G2.

Transistors MP2A to MP4A are added with the purpose of switching different output branches of current mirror 48 in and out, thus altering the total current sourced out of common drain node 60 of transistors MP2D to MP5D. Transistors MP2B to MP4B are added for charge cancellation when transistors MP2A to MP4A are switched on and off. Charge canceling transistors MP2B to 4B are driven with the inverted version of the gate drive of switch transistors MP2A to 4A, thereby canceling out (minimizing) the total parasitic charge coupled from the gate terminals of these transistors to the output branches.

In some embodiments, RCS 30 includes a decoder 80 that decodes signals from the lower two integration current level selection bits SS0 and SS1, and from counter bit CNT to enable mirror branches 52, 54, and 56. Decoder 80 includes OR gate G1, and AND gates G2, G3, and G4. Logic gate G1 has input terminals coupled to receive integration current level selection bits SS0 and SS1. Logic gate G2 has input terminals coupled to an output terminal of logic gate GI and counter bit CNT. Logic gate G3 has input terminals coupled to receive integration current level selection bit SS1 and counter bit CNT. Logic gate G4 has input terminals coupled to receive integration current level selection bits SS0 and SS1, and counter bit CNT.

Transistors MP1A and MP1B, and transistors MP5A and MP5B are added to respective branches 50 and 58 to keep the bias conditions matched between all branches even though reference branch 50 and output branch 58 are not switched on and off. As previously discussed, the gate signals of switches 62, 64, and 66 are decoded from the lower two integration current level selection bits SS0 and SS1 and from counter bit CNT. The output current of current mirror 48 (current into transistor MN1D) is written as:

$$ID(MN1D)=3.2 \text{ uA}*[1+CNT*((SS0 \oplus SS1)+2*SS1+4*(\overline{SS0} \cdot SS1))] \quad (1.2)$$

In Equation 1.2, bits CNT, SS0, and SS1 are binary signals which can assume the values of 0 or 1, ⊕denotes logical OR operation and, $\otimes$ denotes the logical AND operation.

Current ID(MN1D) is the input current of current mirror 101. Transistors MN1C, MN1D, MN2C, MN2D, MN3C, MN3D, MN4C, MN4D, MN5C, and MN5D form an NMOS cascode current mirror 101. Current mirror 101 includes a reference branch 110 and four output branches 120, 130, 140, and 150. Reference branch 110 includes transistors MN1C and MN1D. Transistor MN1D has a drain terminal coupled to common drain node 60, a source terminal coupled to a drain terminal of transistor MN1C, and a gate terminal coupled to the gate terminals of transistors MN2D to MN5D. Transistor MN1C has a gate terminal coupled to the gate terminals of transistors MN2C to MN5C. Transistors MN1C and MN1D are diode connected transistors.

Output branch 120 includes transistor MN2D coupled in series with transistor MN2C. Output branches 130, 140, and 150 contain transistors MN3C, MN3D, MN4C, MN4D, MN5C, and MN5D connected in the same manner as the transistors in MN2C and MN2D in output branch 120. Transistors MN2D and MN3D have their drain terminals coupled to a terminal IUP while transistors MN4D and MN5D have their drain terminals coupled to a terminal IDN.

In some embodiments, transistors MN2C, MN2D, MN4C, and MN4D have one fourth of the channel widths and the same channel lengths of transistors MN1C and MN1D so the drain currents of transistors MN2D and MN4D are equal to one fourth of the input current on transistor MN1D (i.e., current ID(MN1D)). In other words, output branches 120 and 150 have current mirror ratios of 1:4 to reference branch 110. Transistors MN3C, MN3D, MN5C, and MN5D are made 15/4 times the channel widths and the same channel lengths of transistor MN1C and MN1D so the drain currents of transistors MN3D and MN5D are 15/4 times the input current on transistor MN1D. Output branches 130 and 150 have current mirror ratios of 15:4 to reference branch 110.

In some embodiments, output branches 120, 130, 140, and 150 are respectively coupled to ground via switches 122, 132, 142, and 152. Switch 122 includes NMOS transistors MN2A and MN2B. Transistor MN2A has a source terminal coupled to ground, a drain terminal coupled to the source and drain terminals of transistor MN2B (transistor MN2B has source and drain shorted together), and a gate terminal coupled to an output terminal of a logic gate G5. Transistor MN2B has its drain terminal coupled to the source terminal of transistor MN2C and the drain terminal of transistor MN2A, and its gate terminal coupled to an output terminal of an inverter I5. Inverter I5 has an input terminal coupled to the output terminal of logic gate G5.

Switches 132, 142, and 152 are similarly constructed as switch 122 respectively from (1) transistor MN3A, transistor MN3B, and inverter I6; (2) transistor MN4A, transistor MN4B, and inverter I7; and (3) transistor MN5A, transistor MN5B, and inverter I8, respectively. In switch 132, transistor MN3B has a gate terminal coupled to an output terminal of an inverter I6 and transistor MN3A has a gate terminal coupled to an output terminal of logic gate G6. Inverter I6 has an input terminal coupled to the output terminal of logic gate G6. In switch 142, transistor MN4B has a gate terminal coupled to an output terminal of an inverter I7 and transistor MN4A has a gate terminal coupled to an output terminal of logic gate G7. Inverter I7 has an input terminal-coupled to the output terminal of logic gate G7. In switch 152, transistor MN5B has a gate terminal coupled to an output terminal of an inverter I8 and transistor MN5A has a gate terminal coupled to an output terminal of logic gate G8. Inverter I8 has an input terminal coupled to the output terminal of logic gate G8.

Transistors MN2A to MN5A are added to switch different output branches of current mirror 101 in and out, thus altering the total current sunk at terminals IUP and IDN. Transistors MN2B to MN5B are added for charge cancellation when transistors MN2A to MN5A are switched on and off. Charge cancellation transistors MN2B to MN5B are driven with the inverted version of the gate drive of switch transistors MN2A to MN5A, thereby canceling out (minimizing) the total parasitic charge coupled from the gate terminals of these transistors to the current mirror branch of interest.

RCS 30 includes a decoder 180 that decodes a signal from direction bit UP to select reference current output at either terminal IUP (i.e., selects branches 120 and 130) or terminal IDN (i.e., selects branches 140 and 150). In other words, decoder 180 selects to output the reference current through a path to terminal IUP or a path to terminal IDN determined by direction bit UP. Decoder 180 further decodes signals from the highest integration current level selection bit SS2 and from counter bit CNT to enable the selected output branches. Decoder 180 includes an inverter I1 and AND gates G5, G6, G7, and G8. Logic gate G5 has input terminals coupled to receive direction bit UP and counter bit CNT. Logic gate G6 has input terminals coupled to the output terminal of logic gate G5 and integration current level selection bit SS2. Inverter I1 has an input terminal coupled to direction bit UP. Logic gate G7 has input terminals coupled to an output terminal of inverter I1 and counter bit CNT. Logic gate G8 has input terminals coupled to the output terminal of logic gate G7 and integration current level selection bit SS2. Although reference branch 110 is not switched on and off, transistors MN1A and MN1B are added to reference branch 110 to keep the bias conditions matched between all branches. As described above, the gate signals of switches 122, 132, 142, and 152 are decoded from the highest integration current level selection bit SS2 and from counter bit CNT. The output currents of current mirror 101 are written as:

$$I(IUP)=ID(MN1D)/4*CNT*UP*[1+15*SS2] \quad (1.3)$$

$$I(IDN)=ID(MN1D)/4*CNT*!UP*[1+15*SS2] \quad (1.4)$$

In Equations 1.3 and 1.4, "!" denotes the logical NOT operation in (1.4). Table 1 shows the currents at terminals IUP and IDN.

TABLE 1

| CNT | SS2 | SS1 | SS0 | UP | IUP current | IDN current |
|---|---|---|---|---|---|---|
| 1 | 0 | 0 | 0 | 0 | 0 | ¼*ID(MN6) |
| 1 | 0 | 0 | 0 | 1 | ¼*ID(MN6) | 0 |
| 1 | 0 | 0 | 1 | 0 | 0 | ½*ID(MN6) |
| 1 | 0 | 0 | 1 | 1 | ½*ID(MN6) | 0 |
| 1 | 0 | 1 | 0 | 0 | 0 | 1*ID(MN6) |
| 1 | 0 | 1 | 0 | 1 | 1*ID(MN6) | 0 |
| 1 | 0 | 1 | 1 | 0 | 0 | 2*ID(MN6) |
| 1 | 0 | 1 | 1 | 1 | 2*ID(MN6) | 0 |
| 1 | 1 | 0 | 0 | 0 | 0 | 4*ID(MN6) |
| 1 | 1 | 0 | 0 | 1 | 4*ID(MN6) | 0 |
| 1 | 1 | 0 | 1 | 0 | 0 | 8*ID(MN6) |
| 1 | 1 | 0 | 1 | 1 | 8*ID(MN6) | 0 |
| 1 | 1 | 1 | 0 | 0 | 0 | 16*ID(MN6) |
| 1 | 1 | 1 | 0 | 1 | 16*ID(MN6) | 0 |
| 1 | 1 | 1 | 1 | 0 | 0 | 32*ID(MN6) |
| 1 | 1 | 1 | 1 | 1 | 32*ID(MN6) | 0 |

FIG. 8 shows some embodiments of high voltage output stage (HVOS) 32 (FIG. 5). HVOS 32 converts the output current from reference current source (RCS) 30 to an output current at a terminal VOUT with an output dynamic range which spans from a few hundred millivolts above ground level to a few hundred millivolts below the high voltage supply HV.

Transistors MP6A, MP6B, MP8A, MP8B, MN9A, MN9B, MN12A, and MN12B form a pull-down current path in HVOS 32. A current pulled out of terminal IDN causes a proportional pull-down current output at terminal VOUT. The pull-down path includes current mirrors 201 and 301.

Transistors MP6A, MP6B, MP8A, and MP8B form a PMOS cascode current mirror 201 with a current mirror ratio of 1:4. Transistors MP6A and MP6B form a reference branch of current mirror 201 while transistors MP8A and MP8B form an output branch of current mirror 201. Transistor MP6A has a source terminal coupled to voltage supply V, a drain terminal coupled to a source terminal of transistor MP6B, and a gate terminal coupled to a gate terminal of transistor MP8A. Transistor MP6B has a drain terminal coupled to terminal IDN (FIGS. 5 and 7) from RCS 30, and a gate terminal coupled to a gate terminal of transistor MP8B. Transistors MP6A and MP6B are diode connected transistors. Transistor MP8A has a source terminal coupled to voltage supply V, a drain terminal coupled to a source terminal of transistor MP8B, and a gate terminal coupled to the gate terminal of transistor MP6A. Transistor MP8B has a drain terminal coupled to provide an input current for current mirror 301 (described later), and a gate terminal coupled to the gate terminal of transistor MP6B. Current mirror 201 interfaces current mirror 301.

Transistors MN9A, MN9B, MN12A, and MN12B form an NMOS cascode current mirror 301. Transistors MN9A and MN9B form a reference branch of current mirror 301 while transistors MN12A and MN12B form an output branch of current mirror 301. Transistor MN9B has a drain terminal coupled to the drain terminal of transistor MP8B to receive the input current, a source terminal coupled to a drain terminal of transistor MN9A, and a gate terminal coupled to a gate terminal of transistor MN12B. Transistor MN9A has a source terminal coupled to ground, and a gate terminal coupled to a gate terminal of transistor MN12A. Transistors MN9A and MN9B are diode connected transistors. Transistor MN12B has a drain terminal coupled to terminal VOUT, a source terminal coupled to a drain terminal of transistor MN12A, and a gate terminal coupled to a gate terminal of transistor MN9B. Transistor MN12A has a source terminal coupled to ground, and its gate terminal coupled to the gate terminal of transistor MN9A.

In some embodiments, a high voltage transistor is used for transistor MN12B because the supply voltage for the output side of current mirror 301 is at high voltage level. The high voltage level which may be present at terminal VOUT is effectively blocked by transistor MN12B and thus transistor MN12A does not need to be a high voltage capable transistor. A standard low voltage NMOS transistor is used for transistor MN12A for silicon area savings. Although transistor MN9B does not interface high voltage levels, it also is a high voltage transistor to match transistor MN12B. For the same reason, transistor MN9A is made to match transistor MN12A.

In some embodiments, transistors MP7A, MP7B, MP9A, MP9B, MN10A, MN10B, MN11A, MN11B, MP10A, MP10B, MP11A, and MP11B form a pull-up current path in HVOS 32 (FIG. 5). A current pulled out of terminal IUP (FIG. 8) causes a proportional pull-up current output at terminal VOUT. The pull-up path includes current mirrors 401, 501, and 601. The pull-up current path is similar to the pull-down path with the exception of an additional PMOS cascode current mirror 601 that provides pull-up current to output terminal VOUT.

Transistors MP7A, MP7B, MP9A, and MP9B form a PMOS cascode current mirror 401 with a current mirror ratio of 1:4. Transistors MP7A and MP7B form a reference branch of current mirror 401 while transistors MP9A and MP9B form an output branch of current mirror 401. Current mirror 401 is similarly constructed as current mirror 201.

Transistors MN10A, MN10B, MN11A, and MN11B form an NMOS cascode current mirror 501. Transistors MN10A and MN10B form a reference branch of current mirror 501 while transistors MN11A and MN11B form an output branch of current mirror 501. Current mirror 501 is similarly constructed as current mirror 301 except the drain of transistor MN11B is coupled to current mirror 601 to provide an input current. In some embodiments, high voltage capable transistors are used for transistor MN10B and MN11B.

Transistors MP10A, MP10B, MP11A, and MP11B form PMOS cascode current mirror 601 with a current mirror ratio of 1:1. Transistors MP10A and MP10B form a reference branch of current mirror 601 while transistors MP11A and MP11B form an output branch of current mirror 601. Transistor MP10A has a source terminal coupled to voltage supply HV (high voltage supply), a drain terminal coupled to a source terminal of transistor MP10B, and a gate terminal coupled to a gate terminal of transistor MP11A. Transistor MP10B has a drain terminal coupled to the drain terminal of transistor MN11B to receive input current, and a gate terminal coupled to a gate terminal of transistor MP11B. Transistors MP10A and MP10B are diode connected transistors. Transistor MP11A has a source terminal coupled to voltage supply HV, a drain terminal coupled to a source terminal of transistor MP11B, and a gate terminal coupled to the gate terminal of transistor MP10A. Transistor MP11B has a drain terminal coupled to output terminal VOUT, and its gate terminal coupled to the gate terminal of transistor MP10B.

In some embodiments, transistor MP11B is a high voltage transistor because transistor MP11B needs to sustain high drain-source voltages. Transistor MP10B is also a high voltage transistor to match transistor MP11B. Transistors MP10A and MP11A are identical low voltage transistors but they are placed in high voltage wells biased at voltage level HV. The bulk to drain, bulk to source and gate to source voltages of transistors MP10A and MP11A do not exceed voltage levels permissible for low voltage transistors.

Transistor MN7 has a drain terminal coupled to the drain terminal of transistor MP6B, a gate terminal coupled to reference voltage VB, and a source terminal coupled to ground. Similarly, a transistor MN8 has a drain terminal coupled to the drain terminal of transistor MP7B, a gate terminal coupled to reference voltage VB, and a source terminal coupled to ground. Transistors MN7 and MN8 have a size of 0.5 relative to the reference MOS transistor MNB.

Transistors MN7 and MN8 provide a low value trickle current to current mirrors 201, 301, 401, 501, and 601. This small amount of current helps to keep the transistors near conduction so they can respond to fast changes in the input currents at terminals IUP and IDN. Since the same trickle current is applied to both terminals IUP and IDN, the net output current at terminal VOUT is zero in absence of current at terminals IUP or IDN from RCS 30.

Transistors MN7 and MN8 can each be replaced by a resistor or a diode connected transistor to generate the reference current when MN6 is replaced by a resistor or a diode connected transistor. In these embodiments, line 40 carrying reference bias voltage VB is eliminated from driver array 1-3 to further reduce the number of components in control circuitry 5-3.

In some embodiments, HVOS 32 (FIGS. 5 and 8) is suitable for the implementation of effective electrostatic discharge (ESD) protection schemes. A resistor in series with terminal VOUT (not shown) may limit the amount of ESD current that can flow through terminal VOUT within safe limits. The current drive nature HVDCI 16 accommodates this resistor with no measurable impact on performance.

The dynamic range of HVDCI 16 extends to within a few hundred mV of the supply rails (e.g., 0V to HV). The output current of the HVDCI cell 16 is given as:

$$I(VOUT)=[I(IDN)-I(IUP)]/4 \quad (1.4)$$

Using Equations 1.1 through 1.4, the voltage level change on IAH capacitor 34 in one update cycle is expressed as:

$$\Delta V(C_{IAH})=200 \text{ nA}*2^{(4*SS2+2*SS1+SS0)}*T_{COUNTER}/10 \text{ pF} \quad (1.5)$$

The minimum voltage step is achieved by programming the counter to count only one ICLK cycle and selecting integration current level selection bits SS0=SS1=SS2=0:

$$\Delta V_{MIN}(C_{IAH})=200 \text{ nA}*1*200 \text{ ns}/10 \text{ pF}=4 \text{ }mV \quad (1.6)$$

The maximum voltage step at the output is achieved by programming the counter to its maximum setting and selecting integration current level selection bits SS0=SS1=SS2=1:

$$\Delta V_{MAX}(C_{IAH})=200 \text{ nA}*128*25.4 \text{ }\mu s/10 \text{ pF}=65.024V \quad (1.7)$$

As is seen from these examples, up to a 14-bit dynamic range can be provided while requiring only 10 control bits (plus a sign bit). Essentially, a seven-bit wide sub-range of the full 14-bit range is accessed in each update cycle, as selected by the integration current level selection (SS) bits. Although the resolution that is obtained in these embodiments in any given update cycle is not a full 14-bits but a function of the SS bits, this does not constitute a problem in application. In application, when the change in the output voltage is large, coarse (low-resolution) control is satisfactory. This case occurs when the position of a micromirror 2 needs to change by a great amount in a short time interval. As micromirror 2 nears its new target position, the feedback loop selects smaller steps with better precision for optimal settling. The fact that the ranges covered by adjacent SS settings overlap helps to maintain continuity. This method of combining the integration time (counter setting) and current scaling (integration current level setting) to attain a 14-bit dynamic range is an advantage of HVMD cell 16.

If this 14-bit range were attained solely by current scaling, the required reference current source would consume unreasonable amounts of die area, rendering the integration of the HVMD cells 14 under each micromirror 2 virtually impossible. If this 14-bit dynamic range were obtained solely by controlling the integration time (using a 14-bit counter), a very long maximum integration time (3.276 ms with 5 Mhz ICLK) or a very fast integration clock (327 Mhz for 50 $\mu s$ maximum integration time) may be needed A very long integration time may not be compatible with the requirements of oversampling. In a typical system with a 1 kHz loop bandwidth and 10 times oversampling, each HVDCI 16 is updated once every 100 $\mu s$. Thus, the integration time cannot be longer than 100 $\mu s$.

On the other hand, increasing the integration clock frequency to achieve high resolution while keeping the maximum integration time within reasonable limits is not feasible either. Firstly, it is very difficult to distribute such a high frequency clock signal within a significantly large die are, which is very typical with the micromirror arrays. Secondly, the IC manufacturing processes which feature HV MOS transistors have usually larger feature size low-voltage CMOS that cannot attain the required speeds.

Table 2 shows the channel widths and the channel lengths of the various transistors in FIGS. 3, 4, 7, and 8.

TABLE 2

| | |
|---|---|
| WB = 11.5 $\mu m$ | LB = 25 $\mu m$ |
| WP1 = 4.5 $\mu m$ | LP1 = 1.5 $\mu m$ |
| WP2 = 11.5 $\mu m$ | LP2 = 3 $\mu m$ |
| WP3 = 11.5 $\mu m$ | LP3 = 1.5 $\mu m$ |
| WN1 = 4.5 $\mu m$ | LN1 = 1.5 $\mu m$ |
| WN2 = 11.5 $\mu m$ | LN2 = 3 $\mu m$ |
| WN3 = 11.5 $\mu m$ | LN3 = 1.5 $\mu m$ |
| WP4 = 11.5 $\mu m$ | LP4 = 1.5 $\mu m$ |
| WP5 = 65 $\mu m$ | LP5 = 4 $\mu m$ |
| WP6 = 100 $\mu m$ | LP6 = 5 $\mu m$ |
| WP7 = 11.5 $\mu m$ | LP7 = 3 $\mu m$ |
| WN4 = 11.5 $\mu m$ | LN4 = 4 $\mu m$ |
| WN5 = 100 $\mu m$ | LN5 = 5 $\mu m$ |

Figure 9:
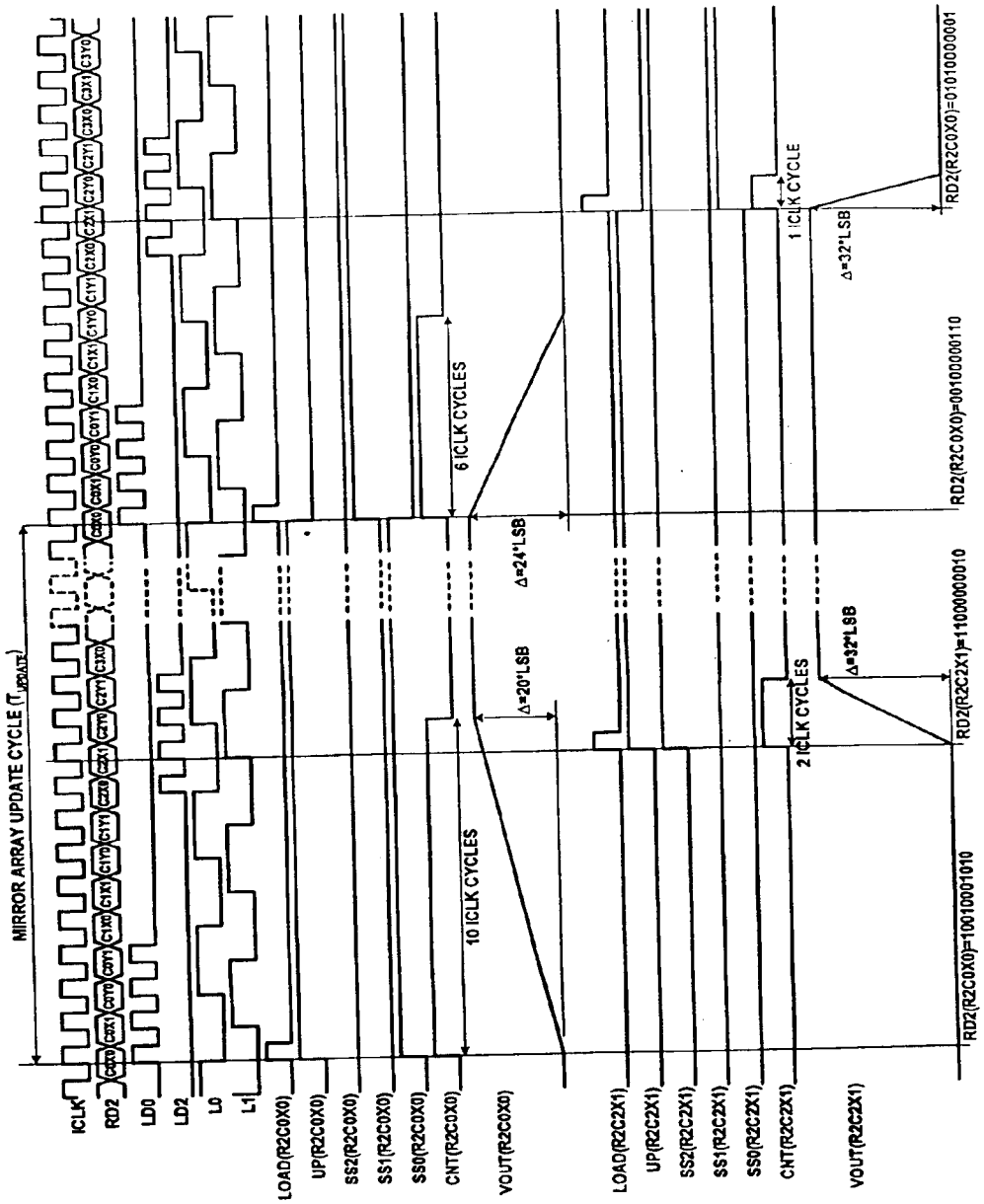
FIG. 9 is a timing diagram of global and representative signals illustrating the operation of the micromirror system of FIG. 3.

FIG. 9 shows a timing diagram for two consecutive update cycles for two HVDCI cells 16 (FIGS. 4 and 5) in the same row but in different columns of the array of FIG. 4. The first HVDCI cell 16 (FIG. 5) drives the X0 drive electrode of the HVMD in row 2, column 0. The second HVDCI cell 16 drives the X1 drive electrode of the HVMD in row 2, column. 2. The digital code words written to the HVMD cells are listed below:

TABLE 3

| HVDCI cell (drive electrode X0, row 2, column 0) | | | | | |
|---|---|---|---|---|---|
| Pass | Code Word | UP | SS2 | SS1 | SS0 | CNT |
| 1st pass | 10010001010 | 1 | 0 | 0 | 1 | 10 |
| 2nd pass | 00100000110 | 0 | 0 | 1 | 0 | 6 |

TABLE 4

| HVDCI cell (drive electrode X1, row 2, column 2) | | | | | |
|---|---|---|---|---|---|
| Pass | Code Word | UP | SS2 | SS1 | SS0 | CNT |
| 1st pass | 11000000010 | 1 | 1 | 0 | 0 | 2 |
| 2nd pass | 01010000001 | 0 | 1 | 0 | 1 | 1 |

The signals in FIG. 9 are defined in Table 5 below.

TABLE 5

| Signal | Definition |
|---|---|
| ICLK | Integration clock. 5 Mhz in one embodiment. There is one ICLK signal per array. |
| RD2 | Row Data bus for Row #2. This is an 11-bit wide bus in one embodiment. There is one RD bus per row. |
| LD0 | LOAD strobe line for Column #0. There is one LOAD strobe signal per column. |
| LD2 | LOAD strobe line for Column #2. There is one LOAD strobe signal per column. |
| L0 | LOAD selector signal #0. This signal, along with L1 and LOAD strobe signal, determines the drive electrode that will be accessed. There is one L0 signal per array. |
| L1 | LOAD selector signal #1. This signal, along with L0 and LOAD strobe signal, determines the drive electrode that will be accessed. There is one L1 signal per array. |
| LOAD(R2C0X0) | Internal LOAD signal for HVDCI X0 of HVMD in Row #2, Column #0. Decoded from LD0, L0, L1. Used to load the data on the RD bus into the latches and the counter of the HVDCI. |

TABLE 5-continued

| Signal | Definition |
|---|---|
| UP(R2C0X0) | UP latch output of HVDCI X0 of HVMD in Row #2, Column #0. |
| SS2(R2C0X0) | SS2 latch output of HVDCI X0 of HVMD in Row #2, Column #0. |
| SS1(R2C0X0) | SS1 latch output of HVDCI X0 of HVMD in Row #2, Column #0. |
| SS0(R2C0X0) | SS0 latch output of HVDCI X0 of HVMD in Row #2, Column #0. |
| CNT(R2C0X0) | CNT counter output of HVDCI X0 of HVMD in Row #2, Column #0 |
| VOUT(R2C0X0) | Output voltage of HVDCI X0 of HVMD in Row #2, Column #0. This voltage is applied to drive electrode X0 for micromirror positioning. |
| LOAD(R2C2X1) | Internal LOAD signal for HVDCI X2 of HVMD in Row #2, Column #2. Decoded from LD0, L0, L1. Used to load the data on the RD bus into the latches and the counter of the HVDCI. |
| UP(R2C2X1) | UP latch output of HVDCI X1 of HVMD in Row #2, Column #2. |
| SS2(R2C2X1) | SS2 latch output of HVDCI X1 of HVMD in Row #2, Column #2. |
| SS1(R2C2X1) | SS1 latch output of HVDCI X1 of HVMD in Row #2, Column #2. |
| SS0(R2C2X1) | SS0 latch output of HVDCI X1 of HVMD in Row #2, Column #2. |
| CNT(R2C2X1) | CNT counter output of HVDCI X1 of HVMD in Row #2, Column #2 |
| VOUT(R2C2X1) | Output voltage of HVDCI X1 of HVMD in Row #2, Column #2. This voltage is applied to drive electrode X1 for micromirror positioning. |

Although FIG. 9 defines the external signals of the some embodiments of the invention, the same functionality can be achieved by different arrangements of the digital control signals while staying within the general spirit of the claims.

Embodiments of driver array 1-3 combine the functions of external DACs and HV amplifiers and integrate them under each micromirror 2, one per drive electrode 3, in a HVMD cell 14. In a digital control loop, the actual voltage value on a given drive electrode 3 need not be known since the loop is closed through an optical feedback arrangement that tracks the position of the micromirror 2. Embodiments of driver array 1-3 provides a means to precisely increase or decrease the voltage level applied to drive electrode 3. The precise amount of voltage change in one update cycle is controlled by the digital code word that is delivered to HVMD cell 14 as many times as required by the oversampling rate of the digital control loop. The only external interface to embodiments of driver array 1-3 is through low voltage digital buses 13 and 15. The wiring within embodiments of driver array 1-3 is also of low voltage digital type, which avoids the problems associated with running high voltage-high precision analog signal lines 4 across driver array 1-3. High voltage levels are confined to within small areas at the output stages of the HVDCI cells 16 underneath each individual micromirror 2, thereby minimizing the coupling between drivers of different micromirrors 2. The digital control arrangement offers superior scalability, which is only limited by the speed of the digital logic that can be run in a given process technology. In addition, the high voltage output stages 32 of the HVDCI cells 16 are configured in a way that makes it possible to integrate the design using widely available process technologies which feature high voltage CMOS transistors along with low voltage digital logic.

Although the invention has been described with reference to particular embodiments, the description is a representative example and should not be taken as limiting. For example, the range of output voltage required to electrostatically drive a micromirror 2 depends on the mechanical characteristics of micromirror 2. Thus, the voltages provided by voltage supplies V and HV (FIGS. 7 and 8) can be varied according to the output voltage range required to electrostatically drive a particular micromirror 2. Accordingly in some embodiments, voltage supplies V and HV may provide low voltages and no high voltage transistors are needed in HVOS 32. Embodiments of the invention can also be implemented with bipolar transistors instead of MOS transistors.

In some embodiments a multiplexing scheme can be used where one reference current source 30 can be shared between two or more HVOSs 32. Reference current source 30 may include additional decoders to select additional current mirrors 101 each coupled to a respective HVOS 32. Reference current source 30 may receive at least one or more signals to select a current mirror 101 to provide the reference current to a respective HVOS 32. In some embodiments a multiplexing scheme can be used where one HVDCI front end (HVDCI cell 16 less the HVOS 32) can be shared between different drive electrodes 3 within the HVMD cell 14. In some embodiments the number of drive electrodes 3 can be varied.

In some embodiments the digital interface to external control circuitry 5-3 can be done via high speed serial buses rather than parallel buses 13 and 15 to reduce the number of interface lines required. In such embodiments, HVMD cell 14 may include a serial-to-parallel converter to convert the serial control signals to parallel control signals. In some embodiments, the configuration of the control word can vary to change the counter resolution, the number of integration current level selection bits. Various other adaptations and combinations of features of the embodiments disclosed are within the scope of the invention. Therefore, the invention is limited only by the following claims.

What is claimed is:

1. A MEMS driver, comprising:
   a programmable current source, the programmable current source generating an output current for a programmable time; and
   an integrator coupled to receive the output current from the programmable current source, the integrator providing a voltage which can be coupled to a drive electrode of a MEMS structure, wherein the programmable current source comprises;
   a counter coupled to receive one or more bits representing the programmable time, the counter generating an active count signal during the programmable time;
   a reference current source coupled to the counter to receive the active count signal, the reference current source generating a reference current while receiving the active count signal;
   an output stage coupled to the reference current source to receive the reference current, the output stage generating the output proportional to the reference current; and
   a first data storage element coupled to receive a bit representing a programmable direction, the first data storage element storing the bit representing the programmable direction, the reference current source being coupled to the first data storage element to receive the bit representing the programmable direction, the reference current source generating the reference current through a path determined by the programmable direction.

2. The driver of claim 1, wherein the output current increases or decreases the voltage provided by the integrator by an amount controlled by a digital control word.

3. The driver of claim 1, wherein the programmable current source is coupled to receive a digital control word including one or more bits representing the programmable time.

4. The driver of claim 3, wherein the programmable current source generates the output current in a programmable direction, the digital control word including a bit representing the programmable direction.

5. The driver of claim 4, wherein the programmable current source generates the output current at a programmable current level, the digital control word including one or more bits representing the programmable current level.

6. The driver of claim 1, wherein the MEMS structure is external to the MEMS driver.

7. The driver of claim 1, wherein the MEMS driver fits within the footprint of the MEMS structure to be driven by the MEMS driver.

8. The driver of claim 7, wherein the footprint is at most 1.2 by 1.2 mm$^2$.

9. The driver of claim 7, wherein the MEMS structure is a micromirror.

10. The driver circuit of claim 1, wherein the programmable current source further comprises at least a second data storage element coupled to receive one or more bits representing a programmable current level, the second data storage element storing the one or more bits representing the programmable current level, the reference current source being coupled to the second data storage element to receive the one or more bits representing the programmable current level, thereby to cause the reference current source to generate the reference current at the programmable current level.

11. The driver circuit of claim 1, wherein the integrator is a capacitor.

12. A MEMS driver, comprising:
a programmable current source, comprising:
a reference current source coupled to receive a digital control word, the reference current source generating a reference current in response to the digital control word; and
an output stage coupled to the reference current source to receive the reference current, the output stage generating an output current proportional to the reference current;
an integrator coupled to the output stage to receive the output current, the integrator providing a voltage;
a conductor for coupling the voltage to a drive electrode of a MEMS structure, wherein the output current increases or decreases the voltage provided by the integrator by an amount and in a direction controlled by the digital control word;
a counter coupled to receive one or more bits representing an integration duration from the digital control word, the counter generating an active count signal during the integration duration; and
a plurality of storage elements coupled to receive a bit representing an integration direction and one or more bits representing an integration current level from the digital control word, the storage elements storing the bit representing the integration direction and the one or more bits representing the integration current level;
wherein the reference current source is coupled to the counter to receive the active count signal, and to the storage elements to receive the bit representing the integration direction and the one or more bits representing the integration current level, and wherein the reference current source is capable of generating the reference current through a first path or a second path determined by the integration direction at the integration current level while receiving the active count signal.

13. The MEMS driver of claim 12, wherein the digital control word is supplied by a controller external to the MEMS driver and the controller receives a feedback signal of position of the MEMS structure.

14. The MEMS driver of claim 12, wherein the MEMS structure is external to the MEMS driver.

15. The MEMS driver of claim 12, wherein the MEMS driver fits within a footprint of the MEMS structure to be driven by the MEMS driver.

16. The MEMS driver of claim 15, wherein the footprint is at most 1.2 by 1.2 mm$^2$.

17. The MEMS driver of claim 15, wherein the MEMS structure is a micromirror.

18. The MEMS driver of claim 12, wherein the reference current source comprises:
a first current mirror comprising:
a reference branch; and
a plurality of output branches including a common output node; and
a decoder for selectively enabling none, one, or more of the plurality of output branches of the first current mirror to generate an internal reference current on the common output node.

19. The MEMS driver of claim 18, wherein the first current mirror further comprises a transistor coupling the reference branch to ground, the transistor including a gate terminal coupled to a reference bias voltage.

20. The MEMS driver of claim 18, wherein the first current mirror is a PMOS cascode current mirror.

21. The MEMS driver of claim 18, wherein the plurality of output branches comprises four output branches having current mirror ratios of 1:1, 1:1, 2:1, and 4:1 to the reference branch of the first current mirror.

22. The MEMS driver of claim 18, wherein:
the first current mirror further comprises a plurality of switches each coupling an output branch to a common voltage supply; and
the decoder comprises a plurality of logic gates including:
input lines coupled to the counter and at least one of the plurality of storage elements to respectively receive the active count signal and the one or more bits representing the integration current level; and
output terminals coupled to gate terminals of the switches.

23. The MEMS driver of claim 18, wherein the reference current source further comprises a second current mirror, the second current mirror comprising:
a reference branch coupled to the common output node of the first current mirror to receive the internal reference current; and a first plurality of output branches including the first common output node;
wherein the decoder selectively enables none, one or more of first plurality of the output branches of the second current mirror to generate the reference current on the first common output node.

24. The MEMS driver of claim 23, wherein the second current mirror is a cascode currant mirror.

25. The MEMS driver of claim 23, wherein the second current mirror is a NMOS current mirror.

26. The MEMS driver of claim 23, wherein the first plurality of mirror branches comprises two output branches having current mirror ratios of 15:4 and 1:4 to the reference branch of the second current mirror.

27. The MEMS driver of claim 23, wherein:
the second current mirror further comprises a plurality of switches each coupling an output branch of the first plurality of output branches to a common voltage supply; and
the decoder comprises a plurality of logic gates including:
input lines coupled to the counter to receive the active count signal and to the plurality of storage elements to receive the bit representing the integration direction and the one or more bits representing the integration current level; and
output terminals coupled to gate terminals of the switches.

28. The MEMS driver of claim 23, wherein the second current mirror further comprises a second plurality of output branches including the second common output node, and wherein the decoder selectively enables one or more of the second plurality of output brunches of the second current mirror to generate the reference current on the second common output node.

29. The MEMS driver of claim 28, wherein the second current mirror is a NMOS cascode current mirror.

30. The MEMS driver of claim 28, wherein the second plurality of mirror branches comprises two output branches having current mirror ratios of 15:4 and 1:4 to the reference branch of the second current mirror.

31. The MEMS driver of claim 28, wherein:
the second current mirror further comprises a plurality of switches each coupling an output branch from the first and the second pluralities of output branches to a common voltage supply; and
the decoder comprises a plurality of logic gates including:
input lines coupled to the counter to receive the active count signal and to the plurality of storage elements to receive the bit representing the integration direction and one or more bits representing the integration current level; and
output terminals coupled to gate terminals of the switches.

32. The MEMS driver of claim 28, wherein the output stage comprises:
a first current mirror, comprising:
a first reference branch coupled to the first common output node of the second current mirror of the reference current source to receive the reference current; and
a first output branch including a first output node;
a second current mirror, comprising:
a second reference branch coupled to the first output node of the first mirror branch; and
a second output branch including a second output node coupled to the integrator, the second output node carrying the output current in a down direction.

33. The MEMS driver of claim 32, wherein at least one of the first and the second current mirrors is a NMOS cascode current mirror.

34. The MEMS driver of claim 32, wherein the first and the second output branches have respective current mirror ratios of 1:4 and 1:1 to the first and the second reference branches.

35. The MEMS driver of claim 32, wherein the second output branch includes a high voltage transistor.

36. The MEMS driver of claim 32, wherein the output stage further includes a transistor coupling the first reference branch to ground, the transistor including a gate terminal coupled to the reference bias voltage.

37. The MEMS driver of claim 32, where the output stage further comprises:
a third current mirror, comprising:
a third reference branch coupled to the second common output node of the second current mirror of the reference current source to receive the reference current; and a third output branch including a third output node;
a fourth current mirror, comprising:
a fourth reference branch coupled to the third output node of the third output branch; and a fourth output branch including a fourth output node; a fifth current mirror, comprising:
a fifth reference branch coupled to the fourth output node of the fourth output branch; and
a fifth output branch including a fifth output node coupled to the integrator, the fifth output node carrying the output current in an up direction.

38. The MEMS driver of claim 37, wherein the third and the fifth current mirrors are PMOS cascode current mirrors.

39. The MEMS driver of claim 37, wherein the third, the fourth, and the fifth output branches have current mirror ratios of 1:4, 1:1, and 1:1 to the third, the fourth, and the fifth reference branches.

40. The MEMS driver of claim 37, wherein each of the fourth and the fifth output branches includes a high voltage transistor including a source coupled to a high voltage supply.

41. The MEMS driver of claim 37, wherein the output stage further includes a transistor coupling the third reference branch to ground, the transistor including a gate terminal coupled to the bias voltage.

42. The MEMS driver of claim 12, wherein the integrator is a capacitor.

43. A driver circuit for electrostatically driving a MEMS structure, comprising:
a programmable current means generating an output current for a programmable time; and
an integrating means coupled to receive the output current from the programmable current means, the integrating means providing a voltage which can be coupled to a drive electrode of a MEMS structure, wherein the driver circuit fits within a footprint of the MEMS structure to be driven by the driver circuit, wherein the programmable current means comprises;
a timing means coupled to receive one or more bits representing the programmable time, the timing means generating an active count signal during the programmable time;
a reference current means coupled to the timing means to receive the active count signal, the reference current means generating a reference current while receiving the active count signal;
a voltage output means coupled to the reference current means to receive the reference current, the voltage output means generating the output current proportional to the reference current; and
a first data storage means coupled to receive a bit representing a programmable direction, the first data storage means storing the bit representing the programmable direction, the reference current means being coupled to the first data storage means to receive the bit representing the programmable direction, the reference current means generating the reference current through a path determined by the programmable direction.

44. The driver circuit of claim 43, wherein the output current increases or decreases the voltage provided by the integrating means by an amount controlled by a digital control word.

45. The driver circuit of claim 43, wherein the programmable current means is coupled to receive a digital control word including one or more bits representing the programmable time.

46. The driver circuit of claim 45, wherein the programmable current means generates the output current in a programmable direction, the digital control word including a bit representing the programmable direction.

47. The driver circuit of claim 46, wherein the programmable current means generates the output current at a programmable current level, the digital control word including one or more bits representing the programmable current level.

48. The driver circuit of claim 43, wherein the MEMS structure is external to the driver circuit.

49. The driver circuit of claim 43, wherein the MEMS structure is a micromirror.

50. The driver circuit of claim 43, wherein the programmable current means further comprises at least a second data storage means coupled to receive one or more bits representing a programmable current level, the second data storage means storing the one or more bits representing the programmable current level, the reference current means being coupled to the second data storage means to receive the one or more bits representing the programmable current level, the reference current means generating the reference current at the programmable current level.

* * * * *